(12) United States Patent
Du et al.

(10) Patent No.: US 9,665,370 B2
(45) Date of Patent: May 30, 2017

(54) SKIPPING OF DATA STORAGE

(71) Applicant: QUALCOMM Incorporated, San Diego, CA (US)

(72) Inventors: Yun Du, San Diego, CA (US); Lin Chen, San Diego, CA (US); Andrew Evan Gruber, Arlington, MA (US); Chihong Zhang, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/462,932

(22) Filed: Aug. 19, 2014

(65) Prior Publication Data

US 2016/0054998 A1 Feb. 25, 2016

(51) Int. Cl.
| | | |
|---|---|---|
| *G06T 15/00* | (2011.01) | |
| *G06F 9/30* | (2006.01) | |
| *G06T 1/20* | (2006.01) | |
| *G06F 9/38* | (2006.01) | |
| *G06F 9/45* | (2006.01) | |

(52) U.S. Cl.
CPC .......... *G06F 9/30098* (2013.01); *G06F 8/441* (2013.01); *G06F 9/30145* (2013.01); *G06F 9/30181* (2013.01); *G06F 9/3828* (2013.01); *G06F 9/3859* (2013.01); *G06T 1/20* (2013.01); *G06T 2200/28* (2013.01)

(58) Field of Classification Search
CPC ......... G06T 15/005; G06T 1/20; G06T 15/04; G09G 5/363; G06F 9/3851
USPC ....................................................... 345/522
See application file for complete search history.

(56) References Cited

U.S. PATENT DOCUMENTS

| | | | | |
|---|---|---|---|---|
| 6,717,576 B1 * | 4/2004 | Duluk, Jr. | ............. | G06T 15/005 |
| | | | | 345/419 |
| 7,725,687 B2 | 5/2010 | Menon et al. | | |
| 8,738,860 B1 * | 5/2014 | Griffin | ................ | G06F 12/0897 |
| | | | | 711/122 |
| 2004/0111568 A1 * | 6/2004 | Nguyen | ................ | G06F 9/3824 |
| | | | | 711/154 |
| 2007/0136562 A1 | 6/2007 | Caprioli et al. | | |
| 2008/0307029 A1 | 12/2008 | Kan | | |
| 2009/0049276 A1 * | 2/2009 | Bergland | ............ | G06F 9/30036 |
| | | | | 712/24 |

(Continued)

FOREIGN PATENT DOCUMENTS

EP 1199629 A1 4/2002

OTHER PUBLICATIONS

International Search Report and Written Opinion—PCT/US2015/043649—ISA/EPO—Oct. 12, 2015 11 pages.

(Continued)

*Primary Examiner* — Ke Xiao
*Assistant Examiner* — Gordon Liu
(74) *Attorney, Agent, or Firm* — Schumaker & Sieffert, P.A.

(57) ABSTRACT

Techniques are described in which an indication is included to indicate a last use of an intermediate value generated as part of determining a final value is not be stored in a general purpose register (GPR). A processing unit avoids storing the intermediate value in the GPR based on the indication because the intermediate value is no longer needed for determining the final value.

16 Claims, 6 Drawing Sheets

(56) References Cited

U.S. PATENT DOCUMENTS

2013/0086368 A1* 4/2013 Gschwind ............ G06F 9/3832
                                                    712/226
2013/0311532 A1   11/2013 Olsen
2013/0332704 A1   12/2013 Guerrero
2014/0019726 A1    1/2014 Toi et al.

OTHER PUBLICATIONS

Lozano L.A., et al., "Exploiting Short-Lived Variables in Superscalar Processors", Proceedings of the 28th Annual International Symposium on Microarchitecture, Nov. 29-Dec. 1, 1995, XP010151038, pp. 292-302.

International Preliminary Report on Patentability from corresponding PCT Application Serial No. PCT/US2015/043649 dated Jul. 20, 2016 (20 pages).

* cited by examiner

SKIPPING OF DATA STORAGE

TECHNICAL FIELD

This disclosure relates to data storage, and more particularly, to data storage techniques in general purpose registers (GPRs).

BACKGROUND

Processing units, such as graphics processing units (GPUs), include processing cores having general purpose registers (GPRs) that store data resulting from the execution of an instruction or data needed for the execution of an instruction. For example, a processing element of the processing core includes an arithmetic logic unit (ALU) that performs a plurality of arithmetic operations. The GPR may store the results of the arithmetic operations and/or store operands of the arithmetic operations.

The GPR may be local to the processor core of the processing unit. Accordingly, accessing a GPR may require less power than accessing local cache memory or external system memory. Although more power efficient than local cache memory or external system memory, storing data to the GPR does consume power.

SUMMARY

In general, the disclosure describes techniques for skipping access to a general purpose register (GPR) so that data that does not need to be accessed again is not stored in the GPR. A compiler may determine whether data is not needed for executing subsequent instructions of a program. If the data is not needed for executing subsequent instructions, the compiler may indicate that the data is not needed for executing subsequent instructions. A processing unit may determine that the data is not needed for executing subsequent instructions based on the indication, and in response, avoid storing the data in the GPR (i.e., skip storage of the data in the GPR). In this manner, power consumption may be reduced by avoiding unnecessary access to the GPR for storing data that is not subsequently needed.

In one example, the disclosure describes a method of processing values in a data processing system, the method comprising receiving a plurality of sub-instructions of an instruction of a program, wherein the instruction defines a plurality of operations, and wherein each of the sub-instructions defines a constituent operation of the plurality of operations, receiving an indication for at least one intermediate value generated by execution of one of the sub-instructions that indicates whether the intermediate value is to be stored in a general purpose register (GPR), determining whether the intermediate value is to be stored in the GPR based at least in part on the received indication, and avoiding the storage of the intermediate value in the GPR if determined that the intermediate value is not to be stored in the GPR.

In one example, the disclosure describes a device for processing data, the device comprising a processing unit comprising a core, the core comprising an instruction store, a general purpose register (GPR), and at least one processing element, the at least one processing element comprising a controller, and a pipeline structure having a plurality of execution stages, wherein the controller is configured to receive a plurality of sub-instructions of an instruction of a program from the instruction store of the core, wherein the instruction defines a plurality of operations, wherein each of the sub-instructions defines a constituent operation of the plurality of operations, and wherein the sub-instructions are executed by the plurality of execution stages of the pipeline structure, receive an indication for at least one intermediate value generated by execution of one of the sub-instructions on one of the plurality of execution stages that indicates whether the intermediate value is to be stored in the GPR, determine whether the intermediate value is to be stored in the GPR based at least in part on the received indication, and avoid the storage of the intermediate value in the GPR if determined that the intermediate value is not to be stored in the GPR.

In one example, the disclosure describes a computer-readable storage medium having instructions stored thereon that when executed by one or more processing units cause the one or more processing units to receive a plurality of sub-instructions of an instruction of a program, wherein the instruction defines a plurality of operations, and wherein each of the sub-instructions defines a constituent operation of the plurality of operations, receive an indication for at least one intermediate value generated by execution of one of the sub-instructions that indicates whether the intermediate value is to be stored in a general purpose register (GPR), determine whether the intermediate value is to be stored in the GPR based at least in part on the received indication, and avoid the storage of the intermediate value in the GPR if determined that the intermediate value is not to be stored in the GPR.

In one example, the disclosure describes a device for processing data, the device comprising means for receiving a plurality of sub-instructions of an instruction of a program, wherein the instruction defines a plurality of operations, and wherein each of the sub-instructions defines a constituent operation of the plurality of operations, means for receiving an indication for at least one intermediate value generated by execution of one of the sub-instructions that indicates whether the intermediate value is to be stored in a general purpose register (GPR), means for determining whether the intermediate value is to be stored in the GPR based at least in part on the received indication, and means for avoiding the storage of the intermediate value in the GPR if determined that the intermediate value is not to be stored in the GPR.

In one example, the disclosure describes a method of compiling, the method comprising determining a plurality of sub-instructions from an instruction of a program, wherein the instruction defines a plurality of operations, and wherein each of the sub-instructions defines a constituent operation of the plurality of operations, determining a last use for at least one intermediate value that is to be generated by execution of one of the sub-instructions, wherein determining the last use comprises determining that the intermediate value is no longer needed by the plurality of sub-instructions for generating a final value from the plurality of operations defined by the instruction, and indicating the last use of the at least one intermediate value based on the determination.

The details of one or more examples are set forth in the accompanying drawings and the description below. Other features, objects, and advantages will be apparent from the description, drawings, and claims.

DETAILED DESCRIPTION

Parallel processing units, such as graphics processing unit (GPUs) that are configured to perform many operations in parallel (e.g., at the same time), include one or more processor cores (e.g., shader cores for a GPU) that execute instructions of one or more programs. For ease of description, the techniques described in the disclosure are described with respect to a GPU or a general purpose GPU (GPGPU). However, the techniques described in this disclosure may be extended to parallel processing units that are not necessarily GPUs or GPGPUs, as well as non-parallel processing units (e.g., ones not specifically configured for parallel processing).

The GPU may be designed with a single instruction, multiple data (SIMD) structure. In the SIMD structure, a shader core includes a plurality of SIMD processing elements, where each SIMD processing element executes instructions of the same program, but on different data. A particular instruction executing on a particular SIMD processing element is referred to as a thread. Each SIMD processing element may be considered as executing a different thread because the data for a given thread may be different; however, the thread executing on a processing element is the same instruction, of the same program, as the instruction executing on the other processing elements. In this way, the SIMD structure allows the GPU to perform many tasks in parallel (e.g., at the same time).

As an example, for vertex processing, the GPU may perform the same tasks for each vertex, but the vertex data for each vertex may be different (e.g., different coordinates, different color values, etc.). The SIMD structure allows the GPU to process many vertices in parallel by executing the same instance of a vertex shader on different SIMD processing elements. In this example, each SIMD processing element may execute a thread of the vertex shader, where each thread is one instance of the vertex shader.

A SIMD processing element includes one or more arithmetic logic units (ALUs), and the SIMD processing element stores the result in a GPR. A GPR is a dedicated register for storing resulting data from one or more SIMD processing elements. The GPR may be accessible only by the processing core that includes the processing elements, and not by other units of the GPU such as hardware units of a graphics pipeline. In this sense, a GPR should not be confused with local cache or local memory of the GPU, which is available to all units of the GPU.

The ALUs perform arithmetic functions such as add, subtract, multiply, divide, etc., based on the arithmetic operation defined in the thread. In some examples, to perform the arithmetic operations defined in the thread, the ALUs produce intermediate values that may be used to perform the arithmetic operations. For instance, the thread may define that three values are to be added. In this case, an ALU may add the first two values together to generate an intermediate value, and add the intermediate value to the third value. The ALU may then store the final resulting value in the GPR.

In some techniques, the ALUs always store the intermediate values in the GPR and then overwrite the intermediate values in the GPR with the final value. However, such storage of the intermediate values in the GPR is not always necessary. By unnecessarily storing intermediate values in the GPR, the GPU unnecessarily consumes power.

As described in more detail below, the techniques described in this disclosure determine whether intermediate values are no longer needed to complete the arithmetic operation defined in the thread. If the intermediate values are no longer needed, the techniques indicate as such, and the GPU may thereby avoid storing (e.g., skip the storing) of the intermediate values in the GPR based on such an indication. In this manner, the techniques described in this disclosure reduce the number of times the GPR needs to be accessed thereby saving power.

For example, a processor, such as a central processing unit (CPU) compiles the program that is to be executed on the GPU via a compiler. As part of the compilation, the compiler may divide an arithmetic operation defined by a thread into constituent operations. The compiler may scan through the constituent operations to determine whether any of the intermediate values, generated by the constituent operations, is no longer needed to complete the arithmetic operation defined by the thread. For any of the intermediate values that are determined to be no longer needed, the compiler may indicate to the GPU that these intermediate values are no longer needed. In response, the GPU may skip the storage of intermediate values in the GPR that are indicated as no longer being needed for the arithmetic operation defined by the thread.

Figure 1:
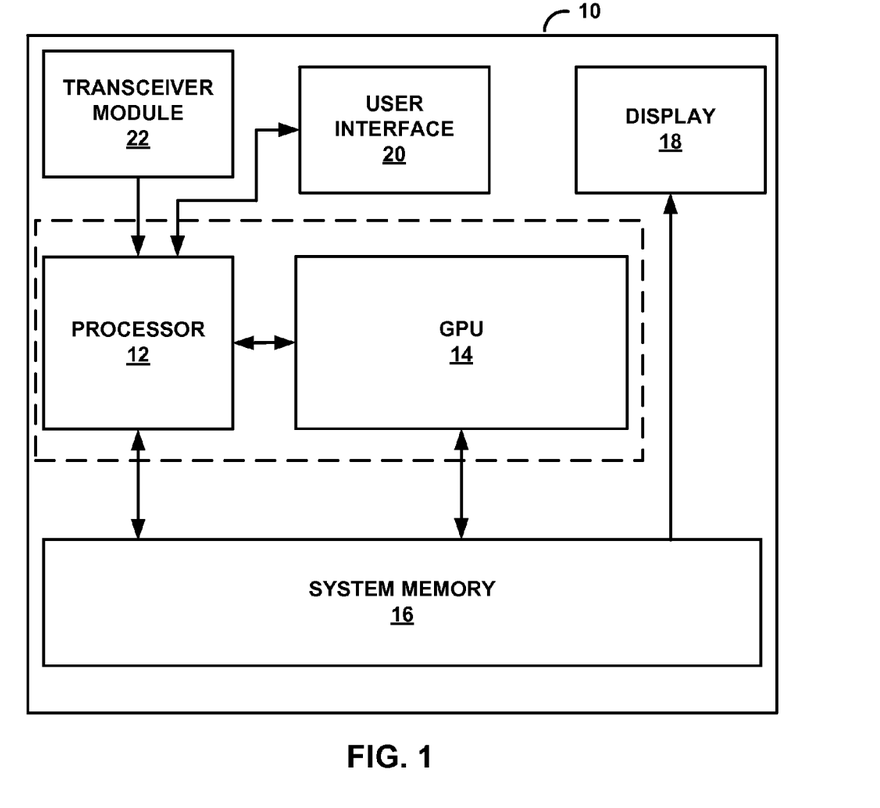
FIG. 1 is a block diagram illustrating an example device for processing data in accordance with one or more example techniques described in this disclosure.

FIG. 1 is a block diagram illustrating an example device for processing data in accordance with one or more example techniques described in this disclosure. FIG. 1 illustrates device 10, examples of which include, but are not limited to, video devices such as media players, set-top boxes, wireless handsets such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC). For example, the IC may be considered as a processing chip within a chip package. In some examples, processor 12 and GPU 14 may be housed in different integrated circuits (i.e., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

In some non-graphics related examples, processor 12 may generate data that is better suited to be processed by GPU 14. Such data need not necessarily be needed for graphics or display purposes. For instance, processor 12 may output data on which matrix operations need to be performed to GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

For example, as described in more detail elsewhere in this disclosure, a compiler executing on processor 12 may determine whether intermediate values generated by instructions of a shader program executing on GPU 14 are not needed to be stored in a general purpose register (GPR) of a shader core of GPU 14 so that the processing element does not need unnecessarily store values in the GPR. System memory 16 may store the compiler code and the code of the shader program that is executed on GPU 14. As another example, an application executing on processor 12 causes GPU 14 to execute the shader program, and system memory 16 may store the instructions of the application that executes on processor 12.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

As described above, GPU 14 provides massive parallel processing capabilities. One way in which GPU 14 provides such parallel processing capabilities is via a single instruction, multiple data (SIMD) structure. In the SIMD structure, GPU 14 executes a plurality of instances of the same program. For instance, graphics processing, and some non-graphics related processing, require the same operations to be performed, but on different data.

For example, GPU 14 may execute shader programs (referred to simply as shaders) that perform graphics or non-graphics related tasks. GPU 14 includes at least one shader core, and the shader programs execute on the shader core. For brevity and ease of description, GPU 14 is described as performing graphics related tasks, but may similarly perform non-graphics related tasks. GPU 14 may execute multiple instances of the shader program to process multiple graphics data values at one time. One example of a shader program is a vertex shader. GPU 14 may execute multiple instances of the vertex shader to process multiple vertices at one time. In general, the operations that need to be performed for a vertex are the same as the operations that need to be performed for other vertices; however, the specific vertex values of each of the vertices may be different.

To execute the multiple instances of a shader program, the shader core of GPU 14 includes a plurality of processing elements, and each processing element may execute one instruction of one instance of the shader program. For example, each processing element may execute a first instruction of the shader program. Although the instruction being executed by the processing elements is the same, the values on which the instruction operates in each processing element may be different. In this sense, each processing element may be considered as executing a thread of the shader program, where the thread is one instruction of the shader program for a given data. Accordingly, each processing element may execute a different thread because the data for each thread may be different, but the underlying instruction for each thread may be the same.

As a basic example, an instruction of a shader program may define an operation of adding three values. In this example, each of the processing elements may add three values, but the specific values being added by each processing element may be different. Accordingly, each processing element may execute a thread of the shader program, where the thread defines an operation of adding three values. Therefore, the instruction may be the same (i.e., add three values), but the one or more of the three values for each processing element may be different. By executing the instruction to add three values on each of the processing elements at the same time, GPU 14 may be able to provide parallel computation of adding three values together, in this example.

In some cases, as part of performing the operations defined by an instruction, the processing element may produce an intermediate value. For example, the instruction may define a plurality of operations (e.g., a combination of additions, subtractions, multiplications, and/or divisions). In this case, each operation of the plurality of operations may be a constituent operation. The result of a constituent operation may be an intermediate value. For instance, the intermediate value is not the final value of the plurality of operations, but the result of one of the constituent operation of the plurality of operations.

Each of the processing elements may store the resulting, final value of the operations performed by the processing element in a general purpose register (GPR) of a shader core. In some examples, storage of the intermediate values generated from the processing element performing a constituent operation in the GPR may not be necessary. For instance, the processing element may feedback an intermediate value for additional processing (e.g., the intermediate value is used as an input value to perform additional constituent operations defined in the instruction). However, this intermediate value may not be needed again, and therefore, there may be no need to store the intermediate value in the GPR.

If an intermediate value is fed back and is then no longer needed, the life cycle of the intermediate value may be considered as ending (e.g., last use of the intermediate value). For such intermediate values (e.g., those whose life cycle has ended), power efficiency may be gained by not storing (e.g., skipping the storing) the intermediate values in the GPR.

For instance, in a shader system with SIMD structure (e.g., such GPU 14 that includes a shader core in the SIMD structure), the GPR structure is normally deep and wide for better density so that the per bit cost is small. In other words, the GPR of a processing element may be configured to store more than just one value. As an example, assume that the values produced by the processing element are 8 bits. In this example, the GPR may store many 32-bit values (e.g., wider because 32 bits is more than 8 bits, and deeper because more than one value can be stored in the GPR).

While having deep and wide GPRs may be beneficial, there may also be some potential drawbacks. For example, for larger sized GPR, the time needed for accessing values (e.g., data) may be greater, causing extra data read pipelines in the processing element (e.g., the processing element being idle while data is being read). Also, accessing the GPR requires the processing element, and hence GPU 14, to consume power.

For example, there may be various units in which GPU 14 may store data (e.g., values). GPU 14 may store data in system memory 16 or may store data in local memory (e.g., cache). The GPR of a shader core is distinct from both system memory 16 and the local memory of GPU 14. For example, system memory 16 is accessible by various components of device 10, and these components use system memory 16 to store data. The local memory of GPU 14 is accessible by various components of GPU 14, and these components use the local memory of GPU 14 to store data. A GPR, however, may only be accessible by the processing elements of the shader core or other units of the shader, and may not be accessible by units external to the shader core.

As described above, if it is the end of life cycle for an intermediate value, such an intermediate value may not be stored in the GPR. Such an example technique was described above with respect to a SIMD structure of GPU 14. However, the techniques described in this disclosure are not limited to a SIMD structure. In general, the techniques described in this disclosure may be applicable to examples of a processing element and GPR combo, where the processing elements implement pipelined execution scheme for the arithmetic operations, as described in more detail. For ease of description, the techniques are described with respect to a SIMD structure, and also because the SIMD structure tends to use a larger GPR size.

In accordance with the techniques described in this disclosure, if it is the last use of an intermediate value, the processing element may avoid storing the intermediate value in the GPR. For example, the processing element may skip the storing of the intermediate value in the GPR. In some examples, the processing element may only feedback the intermediate value as an operand for the other constituent operations of the operations defined by the instruction. If it is not the last use of the intermediate value or if the intermediate value is not being feedback even if the it is the last use of the intermediate value, the processing element may store the intermediate value in the GPR.

There may be various ways to determine whether an intermediate value is at its end of life cycle. For example, processor 12 may execute a compiler that compiles the shader program (e.g., a graphics shader program) that is to execute on the shader core of GPU 14. As part of the compilation, the compiler may separate the plurality of operations defined in the instruction of the shader program into constituent operations. The compiler may then determine when an intermediate value is at its end of life (i.e., when the last use of the intermediate value occurs) by scanning the constituent operations.

When the compiler, executing on processor 12, determines the last use of a particular intermediate value, the compiler may include an indication that indicates the last use of particular intermediate value. For instance, the compiler may include a flag associated with the intermediate value that indicates whether it is the last use of the intermediate value (e.g., a value of 1 for the flag indicates last use and a value of 0 for the flag indicates not last use, or vice-versa).

In such examples, a controller of a processing element may read the flag value associated with the intermediate value, and based on the flag value determine whether the intermediate value is to be stored or not stored (e.g., avoid or skip the storing of the intermediate value). If the intermediate value is not to be stored, the controller of the processing element may skip storing the intermediate value (or block the storage of the intermediate value) in the GPR, and if the intermediate value is to be stored, the controller of the processing element stores the intermediate value in the GPR.

In this manner, the techniques may reduce the amount of times data is stored to the GPR, thereby promoting power saving. For example, each storage to the GPR may consume relatively little power. However, because GPU 14 provides massive parallel processing capabilities, there are many writes to each GPR. By using a scheme that avoids (e.g., skips) storing data in the GPR if storage is not needed, there may be an overall reduction in power usage by GPU 14 as compared to some other techniques.

In some other techniques, the processing element would always store an intermediate value in the GPR. For instance, these other techniques failed to recognize that if an intermediate value is at its end of life cycle, that there may be no appreciable benefit of storing the intermediate value in the GPR, and that there may be a negative impact to storing the intermediate value that is at its end of life cycle. Moreover, these other techniques failed to recognize that a compiler can be leveraged to determine the end of life cycle of an intermediate value, and that the compiler can be used to identify when the last use of the intermediate value (e.g., identify when the end of life cycle of the intermediate value will occur such as with a flag, as one example). These other techniques may not use a controller of a processing element in a shader core of GPU 14 to determine when the last use of an intermediate value is identified, and avoid storing the intermediate value in such cases.

Figure 2:
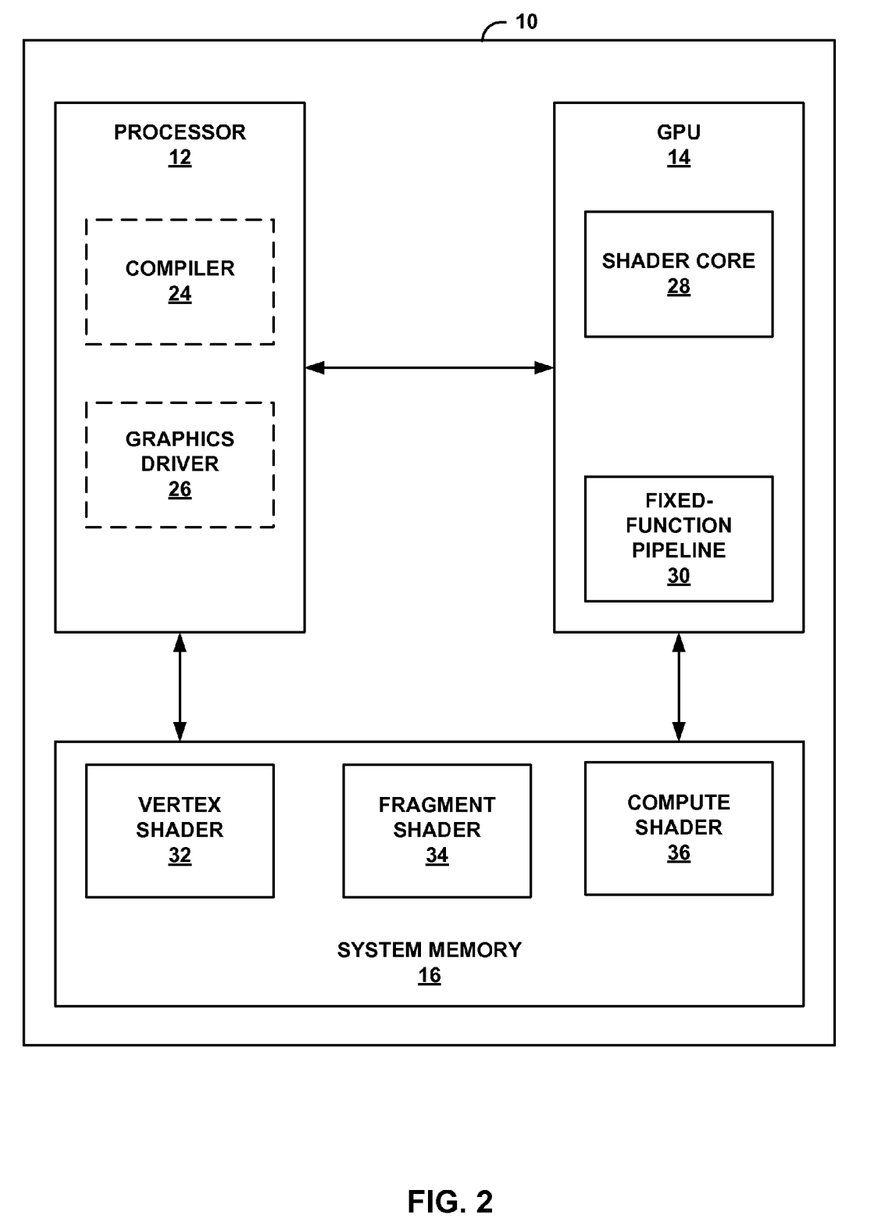
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes shader core 28 and fixed-function pipeline 30. Shader core 28 and fixed-function pipeline 30 may together form a processing pipeline used to perform graphics or non-graphics related functions. The processing pipeline performs functions as defined by software or firmware executing on GPU 14 and performs functions by fixed-function units that are hardwired to perform specific functions.

As described above, the software or firmware executing on GPU 14 may be referred to as shader programs (or simply shaders), and the shader programs may execute on shader core 28 of GPU 14. Although only one shader core 28 is illustrated, in some examples, GPU 14 may include one or more shader cores similar to shader core 28. Fixed-function pipeline 30 includes the fixed-function units. Shader core 28 and fixed-function pipeline 30 may transmit and receive data from one another. For instance, the processing pipeline may include shader programs executing on shader core 28 that receive data from a fixed-function unit of fixed-function pipeline 30 and output processed data to another fixed-function unit of fixed-function pipeline 30.

Shader programs provide users with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include vertex shader 32, fragment shader 34, and compute shader 36. Vertex shader 32 and fragment shader 34 may be shader programs for graphics related tasks, and compute shader 36 may be a shader program for a non-graphics related task. In some examples, only graphics related shader programs like vertex shader 32 and fragment shader 34 may be used. In some examples, only non-graphics related shader programs like compute shader 36 may be used. There are additional examples of shader programs such as geometry shaders, which are not described for purposes of brevity.

As described below, graphics driver 26 executing on processor 12 may be configured to implement an application programming interface (API). In such examples, the shader programs (e.g., vertex shader 32, fragment shader 34, and compute shader 36) may be configured in accordance with the same API as graphics driver 26. Although not illustrated, system memory 16 may store the code for graphics driver 26 that processor 12 retrieves from system memory 16 for execution. Graphics driver 26 is illustrated in a dashed box to indicate that graphics driver 26 is software, executing on hardware (e.g., processor 12), in this example. However, some or all of the functionality of graphics driver 26 may be implemented as hardware on processor 12.

In some examples, system memory 16 may store the source code for one or more of vertex shader 32, fragment shader 34, and compute shader 36. In these examples, compiler 24 executing on processor 12 may compile the source code of these shader programs to create object or intermediate code executable by shader core 28 of GPU 14 during runtime (e.g., at the time when these shader programs need to be executed on shader core 28). In some examples, compiler 24 may pre-compile the shader programs and store the object or intermediate code of the shader programs in system memory 16.

Similar to graphics driver 26, although not illustrated, system memory 16 may store the code for compiler 24 that processor 12 retrieves from system memory 16 for execution. Compiler 24 is illustrated in a dashed box to indicate that compiler 24 is software, executing on hardware (e.g., processor 12), in this example. However, some functionality of compiler 24 may be implemented as hardware on processor 12, in some examples.

Graphics driver 26 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 26.

As an example, processor 12 may execute a gaming application that produces graphics data, and processor 12 may offload the processing of this graphics data to GPU 14. In this example, processor 12 may store the graphics data in system memory 16, and graphics driver 26 may instruct GPU 14 with when to retrieve the graphics data, from where to retrieve the graphics data in system memory 16, and when to process the graphics data. Also, the gaming application may require GPU 14 to execute one or more shader programs. For instance, the gaming application may require shader core 28 to execute vertex shader 32 and fragment shader 34 to generate images that are to be displayed (e.g., on display 18 of FIG. 1). Graphics driver 26 may instruct GPU 14 when to execute the shader programs and instruct GPU 14 with where to retrieve the graphics data needed for the shader programs. In this way, graphics driver 26 may form a link between processor 12 and GPU 14.

Graphics driver 26 may be configured in accordance to an API; although graphics driver 26 does not need to be limited to being configured in accordance with a particular API. In an example where device 10 is a mobile device, graphics driver 26 may be configured in accordance with the OpenGL ES API. The OpenGL ES API is specifically designed for mobile devices. In an example where device 10 is a non-mobile device, graphics driver 26 may be configured in accordance with the OpenGL API.

In the techniques described in this disclosure, shader core 28 may be configured to execute many instances of the same instruction of the same shader program in parallel. For example, graphics driver 26 may instruct GPU 14 to retrieve vertex values for a plurality of vertices, and instruct GPU 14 to execute vertex shader 32 to process the vertex values of the vertices. In this example, shader core 28 may execute multiple instances of vertex shader 32, and do so by executing one instance of vertex shader 32 on one processing element of shader core 28 for each of the vertices.

Each processing element of shader core 28 may execute the same instruction of vertex shader 32 at the same instance; however, the particular vertex values may be different because each processing element is processing a different vertex. As described above, each processing element may be considered as executing a thread of vertex shader 32, where a thread refers to one instruction of vertex shader 32 that is processing a particular vertex. In this manner, shader core 28 may execute many instances of vertex shader 32 to process vertex values of a plurality of vertices in parallel (e.g., at the same time).

Shader core 28 may similarly execute many instances of fragment shader 34 to process pixel values of a plurality of pixels in parallel or execute many instances of compute shader 36 to process many non-graphics related data in parallel. In this manner, shader core 28 may be configured in single instruction, multiple data (SIMD) structure. For ease of description, the following is described with respect to a generic shader program, examples of which include vertex shader 32, fragment shader 34, compute shader 36, and other types of shaders such as geometry shaders.

As also described above, shader core 28 includes a general purpose register (GPR) to store data (e.g., values) generated by the processing elements. For example, a processing element may include a plurality of execution stages. These execution stages may be formed in a pipeline fashion (e.g., one execution stage feeds data into the next execution stage for processing). The output of the last execution stage may output to the GPR for data storage.

In some examples, in processing an instruction of a shader program, the execution stages may produce an intermediate value. This intermediate value may be needed only temporarily, and hence there may be no need to store such an intermediate value in the GPR. Nevertheless, due to the pipeline configuration of the processing element, some techniques require the storage of an intermediate value in the GPR, even if such storage is not necessary. Such storage may needlessly consume power in storing values to the GPR, when such storage is not necessary.

In the techniques described in this disclosure, processor 12, via compiler 24, may determine whether an intermediate value needs to be stored in the GPR or does not need to be stored in the GPR. If the intermediate value does not need to be stored in the GPR, processor 12, via compiler 24, may indicate as such. As one example, processor 12, via compiler 24, may include a flag associated with the intermediate value. The flag indicates whether the intermediate value is to be stored in the GPR or not to be stored. A controller within a processing element of shader core 28 may determine whether the intermediate value is to be stored or not based on the flag and may store or not store the intermediate value in the GPR based on the flag. In other words, the controller may determine whether the intermediate value is to be stored in the GPR based at least in part on a received indication (e.g., the flag). The controller may avoid the storage of the intermediate value in the GPR if determined that the intermediate value is not be stored in the GPR. The controller may store the intermediate value in the GPR if determined that the intermediate value is to be stored in the GPR.

For instance, an instruction of a shader program may define a plurality of operations (e.g., variables that are multiplied, divided, added, subtracted, or a combination). During the compilation of the shader program, compiler 24 may separate the plurality of operations into constituent operations, and create sub-instructions to process each of the constituent operations.

As one example, an instruction of a shader program (referred to as a DP4 instruction) may define the following operations: DP4=X0*X1+Y0*Y1+Z0*Z1+W0*W1. In this example, X0*X1, Y0*Y1, Z0*Z1, and W0*W1 may each be considered as constituent operations for the plurality of operations defined by the DP4 instruction because each of these operations are part of the plurality of operations defined by the DP4 instruction.

In this illustrative example, compiler 24 may separate the DP4 instruction into the following sub-instructions:
Sub-instruction 1: R0=X0*X1;
Sub-instruction 2: R1=Y0*Y1;
Sub-instruction 3: R2=Z0*Z1+R0;
Sub-instruction 4: R3=W0*W1+R1;
Sub-instruction 5: R4=R2+R3.

In this example, R4 equals the final value of the DP4 instruction, which is produced by executing a plurality of sub-instructions. For example, the execution stages of a processing element may execute the above example sub-instructions in a pipeline fashion, where each sub-instruction produces an intermediate value from a constituent operation that is used to generate the final value. For instance, in the above example, R0, R1, R2, and R3 are all intermediate values that are calculated as part of determining the final value R4, but are not the final value themselves. In the above example, the GPR may store the value of R4 as the result of the DP4 instruction.

As can be seen from the above sub-instructions, after sub-instruction 3, intermediate value R0 is no longer needed, after sub-instruction 4, intermediate value R1 is no longer needed, and after sub-instruction 5, intermediate values R2 and R3 are no longer needed. However, in some techniques, due to the pipeline structure of the processing elements of shader core 28, intermediate values R0, R1, R2, and R3 are stored in the GPR even after they are no longer needed.

In the techniques described in disclosure, compiler 24 may scan through the sub-instructions to determine whether any intermediate value does not need to be stored in the GPR, and may indicate as such for any intermediate value that is not needed for storage in the GPR. For instance, in the above example, compiler 24 may determine that intermediate value R0 is no longer needed after sub-instruction 3, intermediate value R1 is no longer needed after sub-instruction 4, and intermediate values R2 and R3 are no longer needed after sub-instruction 5.

In some examples, processor 12, via compiler 24, may include an indication with an intermediate value that indicates that the intermediate value is no longer needed for performing the operations defined by the shader program instruction. For instance, when an intermediate value is no longer needed, compiler 24 may indicate that it is the last use (LU) of the intermediate value, signifying the end of life cycle of the intermediate value. As one example, compiler 24 may include an LU flag that indicates the last use of the intermediate value in the sub-instructions. For instance, the following sub-instructions include the LU flag that signify the end of life cycle of the intermediate values.

Sub-instruction 1': R0=X0*X1;
Sub-instruction 2': R1=Y0*Y1;
Sub-instruction 3': R2=Z0*Z1+(LU) R0;
Sub-instruction 4': R3=W0*W1+(LU) R1;
Sub-instruction 5': R4=(LU) R2+(LU) R3.

In the techniques described in this disclosure, a controller within a processing element may read the LU flags to determine that an intermediate value is not to be stored in the GPR. In these examples, the controller may skip storing (e.g., avoid storing) the intermediate values in the GPR, which in turn may reduce the amount of power consumed by GPU 14. If, however, the LU flag is not asserted for certain intermediate values, the controller may determine that the intermediate value is to be stored in the GPR, and may store the intermediate value in the GPR.

Figure 3:
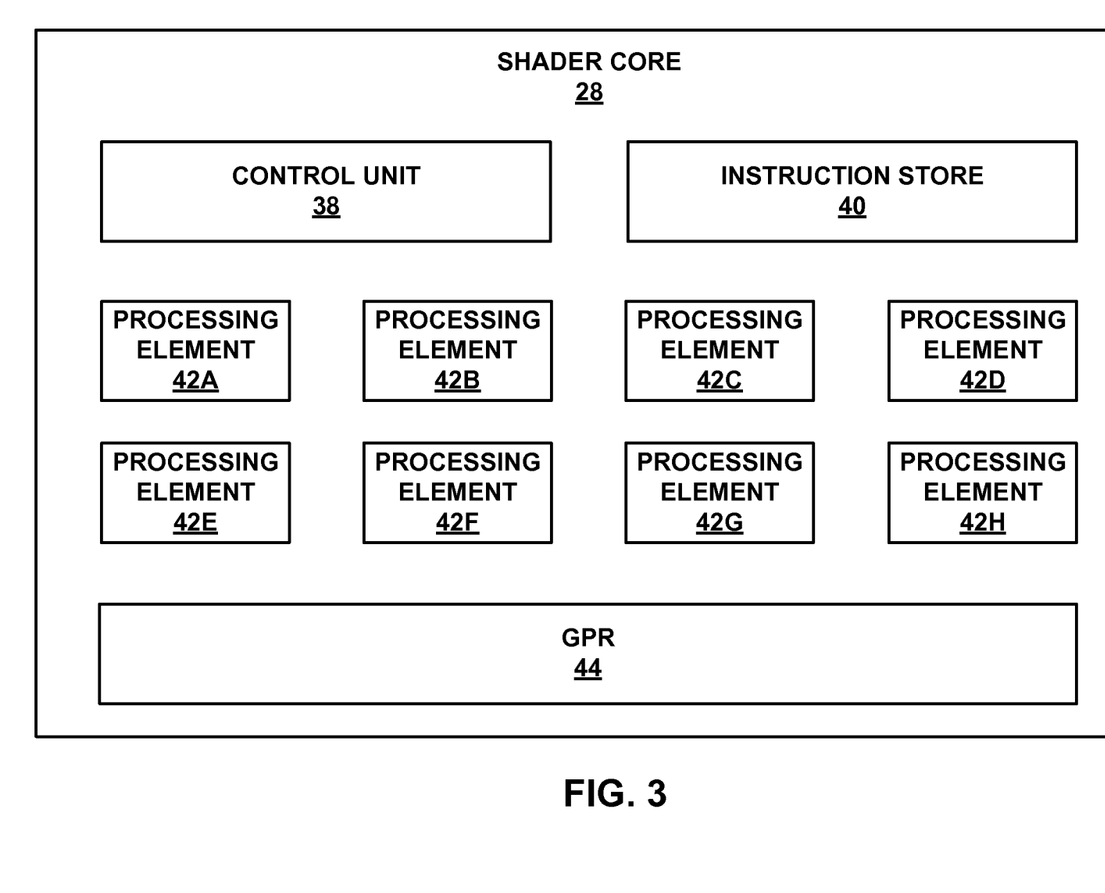
FIG. 3 is a block diagram illustrating one example of a shader core of a graphics processing unit (GPU) of FIG. 2 in greater detail.

FIG. 3 is a block diagram illustrating one example of a shader core of a GPU of FIG. 2 in greater detail. For instance, FIG. 3 illustrates one example of shader core 28 of GPU 14. Shader core 28 may include control unit 38, instruction store 40, one or more processing elements 42A-42H (collectively referred to as "processing elements 42"), and general purpose register (GPR) 44. GPR 44 may store data, and hence, may also be referred to as a data store. Although FIG. 3 illustrates eight processing elements 42, there may be more or fewer than eight processing elements 42 in other examples. Processing elements 42 are examples of processing elements on which instances of the shader program execute in parallel.

Control unit 38 may control the functionality of shader 28. For example, control unit 38 may retrieve the instructions that are to be executed by processing elements 42 and store the instructions in instructions store 40. Also, control unit 38 may retrieve the values (e.g., data) that processing elements 42 are to process and store the values in data store 44.

Instruction store 40 may be any type of memory capable of storing instructions such as, but not limited to, volatile memory, non-volatile memory, a cache, random access memory (RAM), static RAM (SRAM), dynamic RAM (DRAM), etc. Control unit 38 may be hardwired circuitry of shader core 28 that controls the components of shader core 28. However, it may be possible for control unit 38 to be software or firmware, executing on hardware, of shader core 28.

Processing elements 42 are configured to execute threads of a shader program. Each of processing elements 42 may execute a different thread. For example, each of processing elements 42 may execute an instance of an instruction of a shader program with respect to potentially different data items. Processing elements 42 may be single-instruction, multiple-data (SIMD) processing elements. SIMD processing elements refer to processing elements that, when activated, are configured to execute the same instruction at the same time with respect to different data. This may allow processing elements 42 to execute a plurality of threads of a shader program in parallel with respect to different data items. In some cases, each of processing elements 42 may execute instructions of a shader program based on a common program counter that points to an instruction contained in instruction store 40.

If one or more of processing elements 42 are deactivated by control unit 38, then such processing elements 42 do not execute a program instruction for a given instruction cycle. In some cases, control unit 38 may deactivate one or more of processing elements 42 to implement conditional branch instructions where the branching condition is satisfied for some threads and not satisfied for other threads.

In some examples, each of processing elements 42 may include and/or correspond to one or more arithmetic logic units (ALUs). In further examples, each of processing elements 42 may implement ALU functionality. ALU functionality may include addition, subtraction, multiplication, etc.

In accordance with the techniques described in this disclosure, compiler 24 may separate an instruction that defines a plurality of operations into sub-operations, and indicate which intermediate values are not needed to be stored in the GPR of respective processing elements 42. For instance, instruction store 40 may store a sub-instruction with a flag value associated with an intermediate value that indicates whether it is the last use of the intermediate value, where the sub-instruction is derived from the instruction that defines a plurality of operation and that performs one of the constituent operations. A controller within respective processing elements 42 may determine whether the intermediate value is to be stored in the GPR or not, and skip storage (e.g., avoid storing) if storage of the intermediate value is not needed, as indicated by the flag value, or store if storage is needed.

Figure 4:
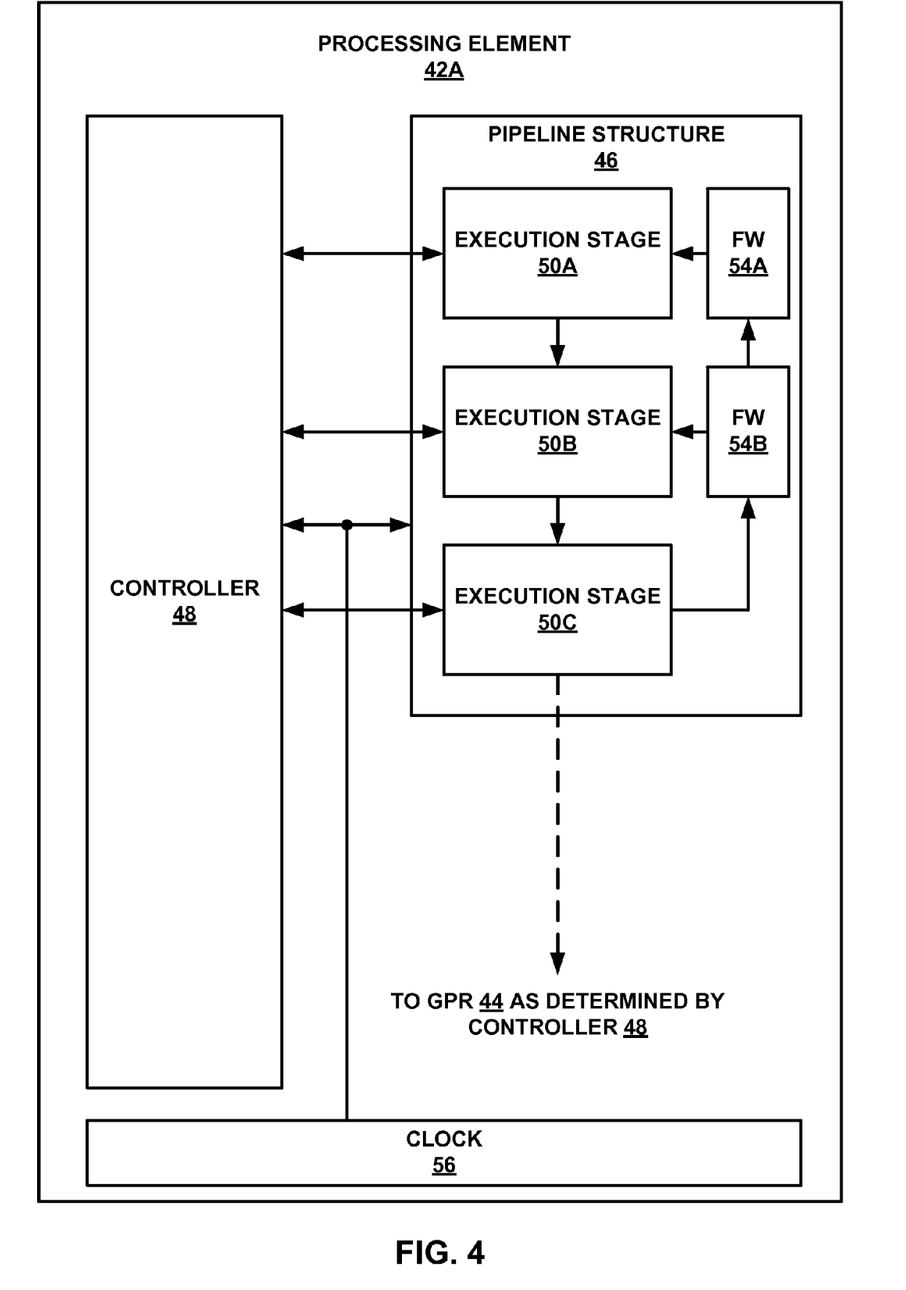
FIG. 4 is a block diagram illustrating one example of a processing element of a shader core of FIG. 3 in greater detail.

FIG. 4 is a block diagram illustrating one example of a processing element of a shader core of FIG. 3 in greater detail. For example, FIG. 4 illustrates processing element 42A. Processing elements 42B-42H may include similar components as those described with respect to processing element 42A. As illustrated, processing element 42A includes pipeline structure 46, controller 48, forwarding logic (FW) 54A and 54B, and clock 56. Pipeline structure 46 includes execution stages 50A-50C (collectively referred to as execution stages 50). As illustrated, pipeline structure 46 includes three execution stages 50. However, pipeline structure 46 may include more or fewer than three execution stages 50 in different examples.

Each one of execution stages 50 performs one function per clock cycle from clock 56. For example, each one of execution stages 50 may be configured to perform an arithmetic operation such as a constituent operation of the plurality of operations defined by an instruction of a shader program. Each one of execution stages 50 may transmit the result of the arithmetic operation to the next of execution stages 50 on a rising or falling edge of clock 56. In this way, execution stages 50 form pipeline structure 46 in which the constituent operations of the plurality of operations defined by an instruction are performed in a pipeline fashion.

Controller 48 may be configured to transmit the sub-instructions that each one of execution stages 50 is to perform. For example, as described above, control unit 38 of shader core 28 may load the instructions, including the sub-instructions as determined by compiler 24, of a shader program into instruction store 40. Controller 48 of processing element 42A may then retrieve the sub-instructions from instruction store 40 and the data values that form the operands for the constituent operations. Controller 48 may feed the operands (e.g., the data values) to respective ones of execution stages 50. Also, if any one of execution stages 50 is to process the data resulting from another one of execution stages 50, then the data from the other one of execution stages 50 may also be an operand into the constituent operation to be performed.

As also illustrated, pipeline structure 46 may include forwarding logic such as forwarding logic 54A and forwarding logic 54B. Forwarding logic 54A and 54B may be considered as internal ALU forwarding logic. For example, in pipeline structure 46, there may be some benefit of being able to transmit back results of one of execution stages 50 to an earlier one of execution stages 50. For instance, one of execution stages 50 may generate an intermediate value that forms as an operand for another constituent operation that is earlier in pipeline structure 46. With forwarding logic 54A and 54B, one of execution stages 50 may be able to forward the value back to an earlier one of execution stages 50 in pipeline structure 46.

Moreover, although not illustrated in FIG. 4, in some examples, processing element 42A may include additional forwarding logic to compensate for latency associated with accessing GPR 44. For example, such latency compensating forwarding logic units may allow the output of execution stage 50C to feedback to execution stage 50A.

In some other techniques, even in those that included latency compensating forwarding logic, GPR 44 always stored the output of execution stage 50C even if such storage was not necessary. For instance, in pipeline structure 46, all values from a previous one of execution stages 50 proceed to the next one of execution stages 50. This may be true even if the value is forwarded. For instance, the output of execution stage 50C may feedback to forwarding logic 54B and may be transmitted GPR 44. Therefore, all intermediate values may travel through execution stages 50, and in these other techniques, all intermediate values would be stored in GPR 44.

As an illustration, an above example of an instruction was X0*X1+Y0*Y1+Z0*Z1+W0*W1, with the following sub-instructions:

Sub-instruction 1: R0=X0*X1;
Sub-instruction 2: R1=Y0*Y1;
Sub-instruction 3: R2=Z0*Z1+R0;
Sub-instruction 4: R3=W0*W1+R1;
Sub-instruction 5: R4=R2+R3.

In pseudo-code, the above may be processed as follows by execution stages 50, viewed from the perspective of execution stage 50A:

Cycle 0: R0=X0*X1;
Cycle 1: R1=Y0*Y1;
Cycle 2: R2=Z0*Z1+R0; //R0 is forwarded on FW 54B
Cycle 3: R3=W0*W1+R1; //R1 is forwarded on FW54B
Cycle 4: NOP; //R0 write to GPR 44
Cycle 5: NOP; //R1 write to GPR 44, R2 is forwarded on FW54A
Cycle 6: R4=R2+R3; //R2 write to GPR 44, R3 is forwarded on FW54B
Cycle 7: NOP; //R3 write to GPR 44

In the above example, writing R0, R1, R2, and R3 to GPR 44 in cycles 4, 5, 6, and 7, respectively, is unnecessary. For example, after cycle 2, R0 is no longer needed, after cycle 3, R1 is no longer needed, and after cycle 6, R2 and R3 are no longer needed. Nevertheless, in these other techniques, R0, R1, and R2 are written to GPR 44 at cycles 4, 5, and 6, respectively, and after these values are no longer needed for determining the final value of instruction DP4, and R3 is written to GPR 44 at cycle 7, even though R3 is no longer needed for determining the final value of instruction DP4.

The following table is an example illustrating the functions performed by each one of execution stages 50 for the above example.

TABLE 1

| Timing of operations through execution stages | | | | | | | |
|---|---|---|---|---|---|---|---|
| T1 | T2 | T3 | T4 | T5 | T6 | T7 | T8 |
| Stage 50A X0, X1 | Y0, Y1 | Z0, Z1 | W0, W1 | | R2 | | |
| Stage 50B | R0 = X0*X1 | R1 = Y0*Y1 | R2 = Z0*Z1 + R0 | R3 = W0*W1 + R1 | | R4 = R2 + R3 | |
| Stage 50C | | R0 | R1 | R2 | R3 | | R4 |

As illustrated in Table 1, at time T1, execution stage 50A receives the values of X0 and X1 from data store 40 via controller 48. At time T2, controller 48 provides execution stage 50B with the sub-instruction that causes execution stage 50B to determine intermediate value R0 by multiplying X0 and X1, and at time T2, execution stage 50A receives the values of Y0 and Y1 from data store 40 via controller 48.

At time T3, execution stage 50C receives intermediate value R0, and controller 48 provides execution stage 50B with the sub-instruction that causes execution stage 50B to determine intermediate value R1 by multiplying Y0 and Y1. Also, at time T3, execution stage 50A receives the values of Z0 and Z1 from data store 40 via controller 48. In addition, intermediate value R0 is forwarded to execution stage 50B via FW 54B. In this example, execution stage 50C write intermediate value R0 (unnecessarily) to GPR 44.

At time T4, execution stage 50C receives intermediate value R1, and execution stage 50C forward R1 to execution stage 50B via FW 54B. Also at time T4, controller 48 provides execution stage 50B with the sub-instruction that cause execution stage 50B to determine intermediate value R2 by multiplying Z0 and Z1 and adding the result to R0. Further, at time T4, execution stage 50A receives the values of W0 and W1 from data store 40 via controller 48. In this example, execution stage 50C writes intermediate value R1 (unnecessarily) to GPR 44.

At time T5, execution stage 50C receives intermediate value R2, and in this example, execution stage 50C writes intermediate value R2 (unnecessarily) to GPR 44. Controller 48 provides execution stage 50B with the sub-instruction that causes execution stage 50B to determine intermediate value R3 by multiplying W0 and W1 and adding the result to R3.

At time T6, execution stage 50C writes intermediate value R3 (unnecessarily) to GPR 44, forwards intermediate value R3 to execution stage 50B, and execution stage 50A receives intermediate value R2. At time T7, execution stage 50B computes R4 as equaling intermediate value R2 plus intermediate value R3. At time T8, execution stage 50C stores value R4 to GPR 44.

In the above example, storage of intermediate values R0, R1, R2, and R3 to GPR 44 is unnecessary because these values are not needed after the last use. However, these intermediate values still pass through the various execution stages 50 for eventual storage in GPR 44. In the techniques described in this disclosure, compiler 24 may determine the end of life cycle (e.g., last use) of an intermediate value and include an indication (e.g., a flag) associated with the intermediate value. In these examples, the intermediate value, even if it is not to be stored in GPR 44 still travels through execution stages 50. However, controller 48 reads the flag associated with the intermediate value, and based on the value of the flag, does not store the intermediate value in GPR 44 (e.g., skips storage of the intermediate value).

For example, compiler 24 may scan through sub-instructions 1-5 of an instruction of a shader program. If an operand (e.g., input to a sub-instruction) is generated in a previous sub-instruction (e.g., is an intermediate value), compiler 24 may determine when that intermediate value is no longer needed for determining the final value of the instruction. For instance, compiler 24 may determine the last use of the intermediate value in the sub-instructions. Based on the determined last use, compiler 24 may include a last use (LU) flag with the intermediate value. In other words, the LU flag indicates the data life cycle is ended after it is used (e.g., read), regardless of whether reading from forward pipelines, latency compensation logic, or GPR 44.

Controller 48 may be configured to read the flag value associated with intermediate value and determine whether the intermediate value is to be stored in GPR 44 or not. For example, as described above, various executions stages 50 may forward data via forwarding logic 54A or 54B and/or via latency compensating logic units. In some examples, controller 48 may determine that intermediate values are being forwarded. If controller 48 determines that the flag associated with the intermediate value indicates last use of the intermediate value and controller 48 determines that the intermediate value is being forwarded (e.g., forwarding logic 54A or 54B and the one or more latency compensating logic units are "active"), then controller 48 may determine that the intermediate value does not need to be stored in GPR 44. In these examples, controller 48 may skip the storage (e.g., avoid storing) the intermediate value in GPR 44.

As described above, in some examples, in addition to determining whether the LU flag is asserted (e.g., a digital one), controller 48 may determine whether the intermediate value associated with the LU flag is being forwarded. In some examples, controller 48 may avoid storing the intermediate value only if the associate LU flag is asserted and the intermediate value is being forwarded. For instance, even if the LU flag is asserted, but the intermediate value is not being forwarded, controller 48 may still store the intermediate value in GPR 44. In other words, if controller 38 determines that the intermediate value is not forwarded, then controller 48 may store the intermediate value in the GPR even if indicated that the intermediate value is not be stored in the GPR. For instance, in some examples, due to instruction fetch latency or if processing element 42A loses arbitration to another thread, then the intermediate value may need to be stored in GPR 44, but not forwarded. Therefore, in some examples, controller 48 may avoid storing an intermediate value if both the LU flag is asserted and the intermediate value is determined to be forwarded.

As an illustration, the disclosure describes pseudo-code for the values being processed through execution stages 50 in the example where intermediate values are unnecessarily stored in GPR 44. The following pseudo-code illustrates the last use (LU) flag, as well as indicating that the intermediate value is being forwarded as a way for controller 48 to determine that the intermediate value does not need to be stored. The following pseudo-code is based on the sub-instructions that include the LU flag, which as described above were:

Sub-instruction 1': R0=X0*X1;
Sub-instruction 2': R1=Y0*Y1;
Sub-instruction 3': R2=Z0*Z1+(LU) R0;
Sub-instruction 4': R3=W0*W1+(LU) R1;
Sub-instruction 5': R4=(LU) R2+(LU) R3.

The pseudo-code with the LU flag is as follows:
Cycle 0: R0=X0*X1;
Cycle 1: R1=Y0*Y1;
Cycle 2: R2=Z0*Z1+(LU) R0; //R0 is forwarded on FW 54B
Cycle 3: R3=W0*W1+(LU) R1; //R1 is forwarded on FW54B
Cycle 4: NOP; //skip R0 write to GPR 44 because forward on FW 54B happened
Cycle 5: NOP; //skip R1 write to GPR 44 because forward on FW 54B happened
Cycle 6: R4=R2+R3; //skip R2 write to GPR 44 because forward on latency compensating logic unit will happen next
Cycle 7: NOP; //skip R3 write to GPR 44, because forward on latency compensating logic unit happens, R2 forwarded via a first one of the latency compensating logic units, R3 forwarded via a second one of the latency compensating logic units.

As described above, in some examples, controller 48 may determine whether forwarding of an intermediate value occurs, as part of determining whether to avoid the storage of the intermediate value in GPR 44. As an example, assume that in the above pseudo-code, there was a delay of three cycles in retrieving the sub-instruction portion of Z0*Z1 for cycle 2 from instruction store 40. This delay could be due to instruction fetch latency or control unit 38 determines that a higher priority thread should execute on processing element 42A, as two examples, and other reasons for the delay are possible.

In this case, intermediate value R0 may still be needed, but the LU flag is asserted. Because R0 would not have been forwarded, controller 48 may determine that intermediate value R0 should be stored in GPR 44, even though the LU flag is asserted. In other words, in this case, even though the LU flag is asserted, controller 48 may not avoid the skipping of storage of intermediate value R0. However, if there was no delay, then intermediate value R0 would be forwarded and its associated LU flag would be asserted (e.g., set to 1 or 0 as the case may be to indicate whether it is the last use of the data); therefore, controller 48 would avoid storing intermediate value R0 in GPR 44.

In FIG. 4, three execution stages 50 and two sets of forwarding logic 54A and 54B are illustrated. In some examples, including additional execution stages 50 and additional forwarding logic may further reduce the amount of data that needs to be written to GPR 44. For example, compiler 24 may be able to perform deeper scanning of the sub-instructions (e.g., scan more sub-instructions) because there are more chances to forward intermediate values. Since there are more chances to forward intermediate values, compiler 24 may identify more cases where controller 48 can skip the storage of intermediate values in GPR 44. For instance, compiler 24 may be able to identify more intermediate values with short life cycle (which tends to be case for many shader program), or compiler 24 may optimize the shader program so that there are more cases with intermediate values with short life cycles.

Moreover, because there are fewer reads and writes to GPR 44, not only do the techniques reduce power consumption, but the techniques described in this disclosure may enhance performance in other ways. For example, processing element 42A may be available earlier than in other techniques for purposes such as texture reads, memory load/store, etc. For instance, in other techniques, processing element 42A may needlessly store data to GPR 44, which causes the amount of time that processing element 42A is allocated to a particular thread to increase. With the techniques described in this disclosure, processing element 42A is available earlier to process the next thread, such as a thread for texture read or memory load/store, earlier because processing element 42A may not store data that is subsequently not needed. In this way, the increase in performance also allows GPR 44 to be available earlier for writing and reading to other write/read clients for access because fewer write and reads happen and GPR 44 becomes free for such processing earlier.

Figure 5:
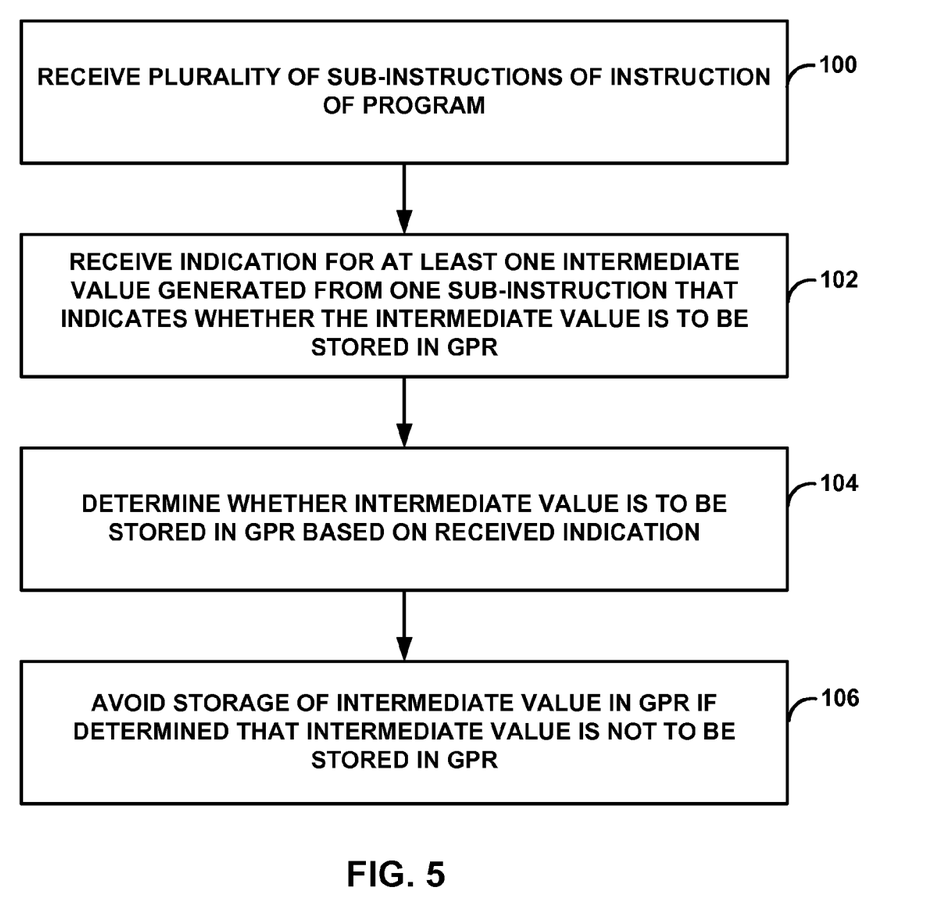
FIG. 5 is a flowchart illustrating an example technique of processing values.

FIG. 5 is a flowchart illustrating an example technique of processing values. In the example illustrated in FIG. 5, a processing element receives a plurality of sub-instructions of an instruction of a program (e.g., a shader program) (100). The instruction defines a plurality of operations, and each of the sub-instructions defines a constituent operation of the plurality of operations. For example, a processing unit (e.g., GPU 14) includes a core (e.g., shader core 28). The core includes an instruction store (e.g., instruction store 40), a GPR (e.g., GPR 44), and at least one processing element (e.g., at least one of processing elements 42), and the at least one processing element includes a controller (e.g., controller 48), and a pipeline structure (e.g., pipeline structure 46) having a plurality of execution stages (e.g., execution stages 50).

As an example, controller 48 is configured to receive the plurality of sub-instructions (e.g., sub-instructions 1'-5') of the instruction (e.g., DP4 instruction) of a shader program. Sub-instructions 1'-5' each define a constituent operation of the plurality of operations defined by the DP4 instruction. Also, in this example, each of processing elements 42 may be configured to execute the same sub-instructions 1'-5' of the same instruction at the same time (e.g., in parallel).

The processing element may also receive an indication for at least one intermediate value generated by execution of one of the sub-instructions that indicates whether the intermediate value is to be stored in a GPR (102). For example, sub-instruction 1' generated the intermediate value R0. In this example, controller 48 received an indication (e.g., the LU flag) for intermediate value R0 in sub-instruction 3' that indicates whether intermediate value R0 is to be stored in GPR 44. The same occurs for intermediate values R1, R2, and R3, but with respect to different sub-instructions.

The controller may determine whether the intermediate value is to be stored in the GPR based at least in part on the received indication (104). For example, when sub-instruction 3' is being executed on one of execution stages 50, controller 48 may determine whether intermediate value R0 is to be stored in GPR 44 based on the LU flag associated with intermediate value R0. Controller 48 may similarly determine whether intermediate values R1, R2, and R3 are to be stored in GPR 44. For instance, when the indication that controller 48 indicates that the intermediate value is not to be stored in GPR 44, the indication (e.g., the LU flag) also indicates last use of the intermediate value in the plurality of sub-instructions. After the last use, the intermediate value is no longer needed by any of the other sub-instructions for determining the final value from the plurality of operations defined by the instruction.

In some examples, controller 48 may also determine whether the intermediate value is forwarded to a previous execution stage from an execution stage that executed the sub-instruction that generated the intermediate value. For instance, execution stages 50 are arranged as a pipeline in pipeline structure 46. Controller 48 may determine that intermediate value R0 is being forwarded via forward logic 54B to a previous execution stage. As another example, controller 48 may determine that intermediate values R2 and R3 are being forwarded via latency compensating forward logic units. In such examples, controller 48 may determine whether the intermediate value is to be stored in GPR 44 based at least in part of the received indication and the determination of whether the intermediate value is forwarded. For example, if determined that the intermediate value is not forwarded to the previous execution stage, controller 48 may store the intermediate value in GPR 44 even if indicated that the intermediate value is not to be stored in GPR 44.

The controller may avoid the storage of the intermediate value if determined that the intermediate value is not to be stored in the GPR (106). For example, controller 48 may skip the storage of the intermediate value in GPR 44, based on the determination that the intermediate value is not to be stored in the GPR based on the indication, to avoid unnecessarily storing data to GPR 44. However, if determined that the intermediate value is to be stored in GPR 44 (e.g., no LU flag), controller 48 may store the intermediate value in GPR 44. In the techniques described in the disclosure, execution stages 50 execute the sub-instructions to generate a final value from the plurality of operations defined by the instruction, where the final value is generated from the intermediate value functioning as an operand to one of the sub-instructions. While controller 48 may not store intermediate values in GPR 44 that do not need to be stored, controller 48 may store the final value in GPR 44 as outputted by execution stage 50C at the end of the sub-instructions.

Figure 6:
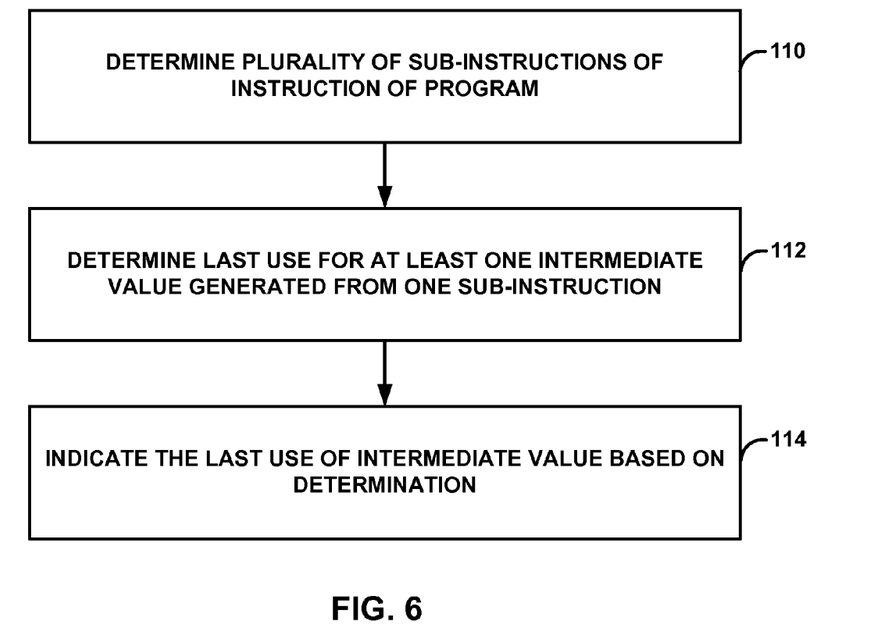
FIG. 6 is a flowchart illustrating an example technique of compiling.

FIG. 6 is a flowchart illustrating an example technique of compiling. In the example illustrated in FIG. 6, compiler 24, executing on processor 12, may determine a plurality of sub-instructions from an instruction of a program (110). The instruction defines a plurality of operations, and each sub-instruction defines a constituent operation of the plurality of operations. For example, compiler 24, executing on processor 12, may determine sub-instructions 1-5 from the DP4 instruction.

Compiler 24, executing on processor 12, may determine a last use for at least one intermediate value that is to be generated by execution of one of the sub-instructions (112). For example, compiler 24 may determine that the intermediate value is no longer needed by the plurality of sub-instructions for generating a final value from the plurality of operations defined by the instruction. For instance, at sub-instruction 3, compiler 24 may determine that intermediate value R0 is no longer needed by the plurality of sub-instructions (e.g., no cycle will need intermediate value R0 again) for generating the final value from the plurality of operations defined by the DP4 instruction. For instance, to generate R4, intermediate value R0 is no longer needed because intermediate value R2 already includes the value of intermediate value R0 (e.g., R2 is generated from intermediate value R0).

Compiler 24, via processor 12, may indicate the last use of the at least one intermediate value based on the determination (114). For example, compiler 24 may include a flag that indicates the last use of the at least one intermediate value in one of the sub-instructions that uses the intermediate value as an operand. For instance, in sub-instruction 3, intermediate value R0 is an operand. In this example, compiler 24 may include the LU flag with intermediate value R0 to produce sub-instruction 3'. The LU flag with intermediate value R0 in sub-instruction 3' indicates the last use of intermediate value R0. In other words, sub-instruction 3' is the last instruction to use intermediate value R0 as an operand.

Further, as described above, indicating the last use of the at least one intermediate value also indicates that the at least one intermediate value does not need to be stored in a GPR. For example, controller 48 may read the LU flag and determine that intermediate value associated with the LU flag does not need to be stored in GPR 44 for processing element 42A, which executes the sub-instructions, of shader core 28 of GPU 14.

Processor 12 may store the compiled sub-instructions (e.g., sub-instructions 1'-5') in system memory 16 as the shader program code. GPU 14 may retrieve the instructions of the shader program, including sub-instructions 1'-5', from system memory 16, when instructed by graphics driver 28. Each of processing elements 42 may execute sub-instructions 1'-5' at the same time (e.g. in parallel).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing values in a data processing system, the method comprising:
   receiving a plurality of sub-instructions of an instruction of a program, wherein the instruction defines a plurality of operations, and wherein each of the sub-instructions defines a constituent operation of the plurality of operations;
   receiving an indication for at least one intermediate value generated by execution of one of the sub-instructions that indicates whether the intermediate value is to be stored in a general purpose register (GPR);
   determining whether the intermediate value is forwarded to a previous execution stage from the execution stage that executed the sub-instruction that generated the intermediate value, wherein the previous execution stage and the execution stage that generated the intermediate value are arranged in a pipeline structure;
   determining whether the intermediate value is to be stored in the GPR based at least in part on the received indication and the determination of whether the intermediate value is forwarded to the previous execution stage; and
   storing the intermediate value in the GPR based on the received indication indicating that the intermediate value is not to be stored in the GPR and based on the determination that the intermediate value is not forwarded to the previous execution stage.

2. The method of claim 1, further comprising:
   executing the sub-instructions to generate a final value, wherein the final value is generated from the intermediate value; and
   storing the final value in the GPR.

3. The method of claim 1,
   wherein the program comprises a shader program,
   wherein receiving the plurality of sub-instructions comprises receiving, with a controller of a processing element of a shader core of a graphics processing unit (GPU), the plurality of sub-instructions,
   wherein receiving the indication comprises receiving, with the controller of the processing element, the indication for the at least one intermediate value generated by execution of one of the sub-instructions that indicates whether the intermediate value is to be stored in the GPR;
   wherein determining whether the intermediate value is forwarded to the previous execution stage comprises determining, with the controller of the processing element, whether the intermediate value is forwarded to the previous execution stage; and
   wherein determining whether the intermediate value is to be stored comprises determining, with the controller of the processing element, whether the intermediate value is to be stored in the GPR.

4. The method of claim 1, wherein receiving the indication comprises receiving a flag associated with the intermediate value that indicates whether the intermediate value is to be stored in the GPR.

5. The method of claim 1, wherein the received indication indicates last use of the intermediate value in the plurality of sub-instructions.

6. A device for processing data, the device comprising:
a processing unit comprising a core, the core comprising an instruction store, a general purpose register (GPR), and at least one processing element, the at least one processing element comprising a controller, and a pipeline structure having a plurality of execution stages, wherein the controller is configured to:
receive a plurality of sub-instructions of an instruction of a program from the instruction store of the core, wherein the instruction defines a plurality of operations, wherein each of the sub-instructions defines a constituent operation of the plurality of operations, and wherein the sub-instructions are executed by the plurality of execution stages of the pipeline structure;
receive an indication for at least one intermediate value generated by execution of one of the sub-instructions on one of the plurality of execution stages that indicates whether the intermediate value is to be stored in the GPR;
determine whether the intermediate value is forwarded to a previous execution stage from the execution stage that executed the sub-instruction that generated the intermediate value, wherein the previous execution stage and the execution stage that generated the intermediate value are arranged in the pipeline structure;
determine whether the intermediate value is to be stored in the GPR based at least in part on the received indication and the determination of whether the intermediate value is forwarded to the previous execution stage; and
store the intermediate value in the GPR based on the received indication indicating that the intermediate value is not to be stored in the GPR and based on the determination that the intermediate value is not forwarded to the previous execution stage.

7. The device of claim 6, wherein the processing unit comprises a graphics processing unit, wherein the core comprises a shader core, and wherein the program comprises a shader program.

8. The device of claim 6, wherein the core includes a plurality of processing elements, including the at least one processing element, and wherein each of the processing elements is configured to execute the same sub-instructions of the same instruction at the same time.

9. The device of claim 6, wherein the plurality of execution stages are configured to execute the sub-instructions to generate a final value, wherein the final value is generated from the intermediate value, and wherein the controller is configured to store the final value in the GPR.

10. The device of claim 6, wherein, to receive the indication, the controller is configured to receive a flag associated with the intermediate value that indicates whether the intermediate value is to be stored in the GPR.

11. The device of claim 6, wherein the received indication indicates last use of the intermediate value in the plurality of sub-instructions.

12. The device of claim 6, wherein the device comprises a wireless communication device.

13. A non-transitory computer-readable storage medium having instructions stored thereon that when executed by one or more processing units cause the one or more processing units to:
receive a plurality of sub-instructions of an instruction of a program, wherein the instruction defines a plurality of operations, and wherein each of the sub-instructions defines a constituent operation of the plurality of operations;
receive an indication for at least one intermediate value generated by execution of one of the sub-instructions that indicates whether the intermediate value is to be stored in a general purpose register (GPR);
determine whether the intermediate value is forwarded to a previous execution stage from the execution stage that executed the sub-instruction that generated the intermediate value, wherein the previous execution stage and the execution stage that generated the intermediate value are arranged in a pipeline structure;
determine whether the intermediate value is to be stored in the GPR based at least in part on the received indication and the determination of whether the intermediate value is forwarded to the previous execution stage; and
store the intermediate value in the GPR based on the received indication indicating that the intermediate value is not to be stored in the GPR and based on the determination that the intermediate value is not forwarded to the previous execution stage.

14. The non-transitory computer-readable storage medium of claim 13, further comprising instructions that when executed cause the one or more processing units to:
execute the sub-instructions to generate a final value, wherein the final value is generated from the intermediate value; and
store the final value in the GPR.

15. The non-transitory computer-readable storage medium of claim 13, wherein the instructions to receive the indication comprise instructions to receive a flag associated with the intermediate value that indicates whether the intermediate value is to be stored in the GPR.

16. The non-transitory computer-readable storage medium of claim 13, wherein the indication indicates last use of the intermediate value in the plurality of sub-instructions.

* * * * *